United States Patent
Torgerson

(10) Patent No.: US 7,134,765 B2
(45) Date of Patent: Nov. 14, 2006

(54) LIGHT DISPERSION DEVICE

(76) Inventor: David W. Torgerson, P.O. Box 1638, Canyon Country, CA (US) 91386-1638

(*) Notice: Subject to any disclaimer, the term of this patent is extended or adjusted under 35 U.S.C. 154(b) by 57 days.

(21) Appl. No.: 10/858,544

(22) Filed: Jun. 2, 2004

(65) Prior Publication Data

US 2005/0270801 A1    Dec. 8, 2005

(51) Int. Cl.
*F21L 4/00*   (2006.01)
(52) U.S. Cl. .................. 362/186; 362/190; 362/577
(58) Field of Classification Search ............ 362/102, 362/116, 186, 190, 191, 577
See application file for complete search history.

(56) References Cited

U.S. PATENT DOCUMENTS

| | | | | |
|---|---|---|---|---|
| 2,358,867 A | * | 9/1944 | Madan ................ 362/577 |
| 2,823,300 A | | 2/1958 | Graubner |
| 3,510,643 A | * | 5/1970 | File ................ 362/26 |
| 3,857,028 A | * | 12/1974 | Olsen ................ 362/187 |
| 3,949,216 A | | 4/1976 | Howe |
| 4,420,796 A | | 12/1983 | Mori |
| 4,740,874 A | | 4/1988 | Wylie et al. |
| 4,782,433 A | | 11/1988 | Rombough |
| 4,822,123 A | | 4/1989 | Mori |
| 4,890,203 A | * | 12/1989 | Watson ................ 362/102 |
| 5,003,437 A | * | 3/1991 | Barrett ................ 362/109 |
| 5,070,437 A | | 12/1991 | Roberts, Sr. |
| 5,091,833 A | * | 2/1992 | Paniaguas et al. ........ 362/191 |
| 5,321,591 A | * | 6/1994 | Cimock et al. ........ 362/186 |
| 5,339,229 A | * | 8/1994 | Snyder ................ 362/208 |
| 5,383,103 A | * | 1/1995 | Pasch et al. ........ 362/102 |
| 5,519,593 A | | 5/1996 | Hasness |
| 5,893,629 A | * | 4/1999 | Gubernick ........ 362/186 |
| 5,980,063 A | * | 11/1999 | Ford et al. ........ 362/186 |
| 6,132,057 A | * | 10/2000 | Williams ........ 362/100 |
| 6,641,280 B1 | | 11/2003 | Hanson et al. |
| 6,886,958 B1 | * | 5/2005 | Grant ................ 362/101 |

FOREIGN PATENT DOCUMENTS

DE    4020080 A1  *  1/1992

* cited by examiner

*Primary Examiner*—Ali Alavi
*Assistant Examiner*—Hargobind S. Sawhney
(74) *Attorney, Agent, or Firm*—Larry F. Gitlin

(57) ABSTRACT

In combination with a tubular light source having a housing body and a closed end for containing a power source and a light emitting end, a device for dispersing light rays comprising a translucent member having an opening therein tailored for receiving and gripping the tubular housing body. The translucent member is positioned around the light emitting end to enhance the scattering and visibility of the light rays emitted therefrom and serves also as a stand to elevate and stabilize the housing body and the light source incorporated therein.

2 Claims, 3 Drawing Sheets

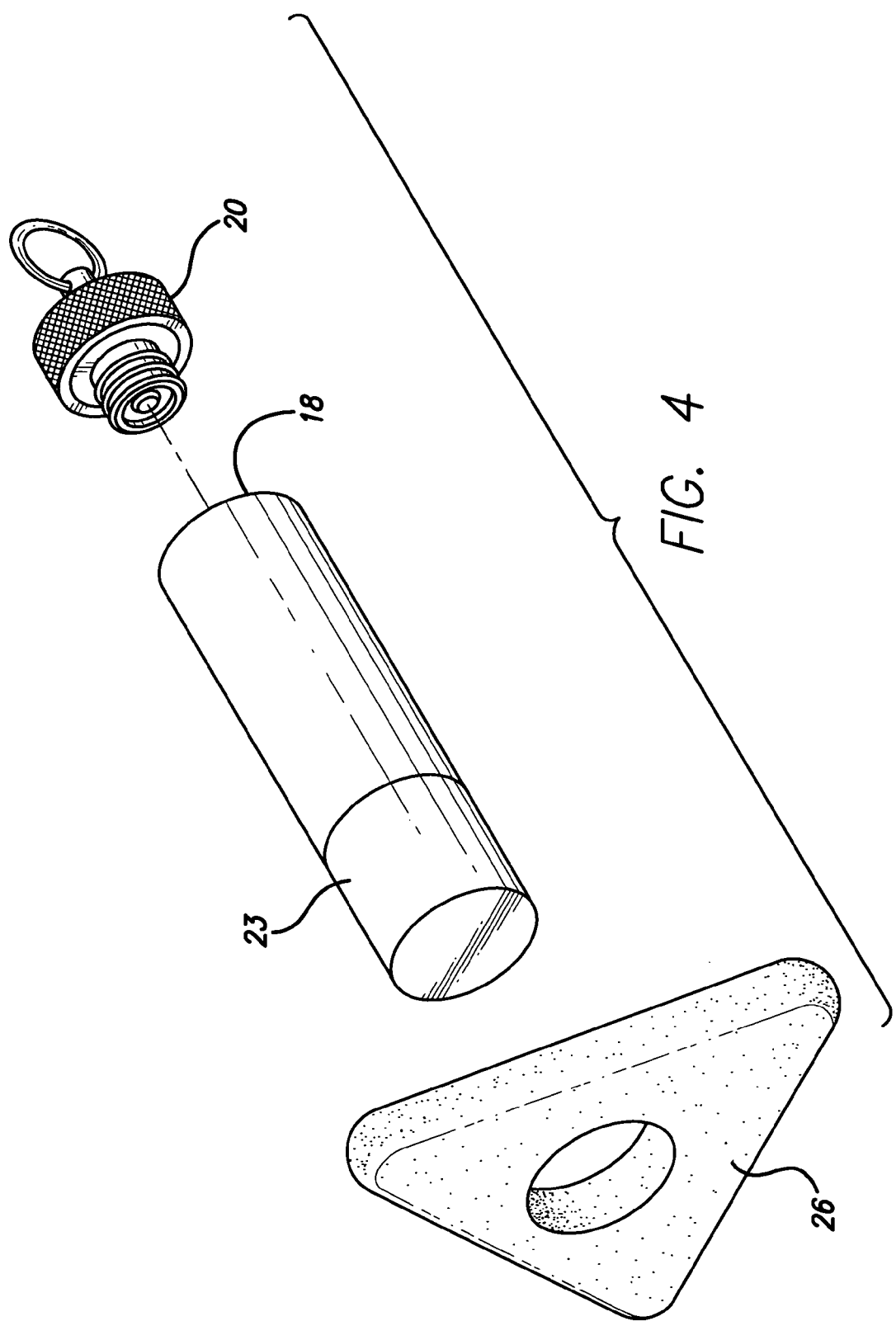

LIGHT DISPERSION DEVICE

BACKGROUND OF THE INVENTION

1. Field of the Invention

The present invention relates generally to the field of light and, more particularly, to an improved device for expanding the effect and increasing the visibility of a high intensity light source.

2. Description of the Invention

Emergency lighting devices, such as those used to alert people to the presence of persons riding bicycles at night, automobile accidents, road debris or obstacles, or other potentially dangerous conditions, are old in the prior art. Such devices, include, without limitation, road flares or triangular light markers, flashing lights, reflective clothing or reflective or luminescent tape adhered to clothing.

A search of the prior art did not disclose any patents that read directly on the claims of the instant invention, or make the claimed invention obvious. However, the following references are considered related:

| U.S. Pat. No. | Inventor | Issue Date |
|---|---|---|
| 5,070,437 | Joseph M. Roberts, Sr. | Dec. 3, 1991 |
| 4,420,796 | Kei Mori | Dec. 13, 1983 |
| 4,740,874 | Bruce E. Wylie, et al. | Apr. 26, 1988 |
| 4,782,433 | John G. Rombough | Nov. 1, 1988 |
| 5,383,103 | Ricky C. Pasch | Jan. 17, 1995 |
| 2,823,300 | H. G. Graubner | Feb. 11, 1958 |
| 3,949,216 | Arnold P. Howe | Apr. 6, 1976 |
| 4,822,123 | Kei Mori | Apr. 18, 1989 |
| 5,519,593 | Richard S. Hasness | May 21, 1996 |
| 6,641,280 | Gary B. Hanson, et al. | Nov. 4, 2003 |

Though most, if not all, of the devices disclosed in the aforesaid prior art references demonstrate some kind of light emitting function, such as the electrical light in FIG. 1 of U.S. Pat. No. 5,070,437; the light dispersing device 10 of U.S. Pat. No. 4,420,796 and the electrical flashlight 30 of U.S. Pat. No. 4,740,874, none of these devices possesses the unique qualities, capabilities and improvements illustrated by the device of the present invention.

Thus, there is a need for the present invention to address and resolve the differences among the prior art devices.

SUMMARY OF THE INVENTION

In its preferred embodiment, the present invention provides, in combination with an elongated light source having a housing body, a closed end for containing a power source and a light emitting end, a device for enhancing the dispersion of light rays comprising a translucent member having an opening therein for receiving the housing body. The translucent member is installed over the light emitting end to enhance the scattering and visibility of the light rays emanating from inside the housing. The translucent member also serves as a stand to elevate and stabilize the housing body and the incorporated light source.

Accordingly, it is an object of the present invention to provide a device for expanding the effect and increasing the visibility of a high intensity light source.

It is also an object of the present invention to provide a device that serves as a stand to elevate and stabilize the housing body and the incorporated light source.

It is yet another object of the present invention to provide a device that is translucent and imbued with various colors.

It is yet another object of the present invention to provide a device that comprises a variety of geometric shapes.

It is yet another object of the present invention to provide a device that is easy to use and inexpensive to manufacture.

Other objects and advantages of the present invention will become apparent in the following specifications when considered in light of the attached drawings wherein the preferred embodiment of the invention is illustrated.

BRIEF DESCRIPTION OF THE DRAWINGS

FIG. 4 is an exploded view of the main components of the device in accordance with the present invention.

DETAILED DESCRIPTION OF THE PREFERRED EMBODIMENT

Figure 1:
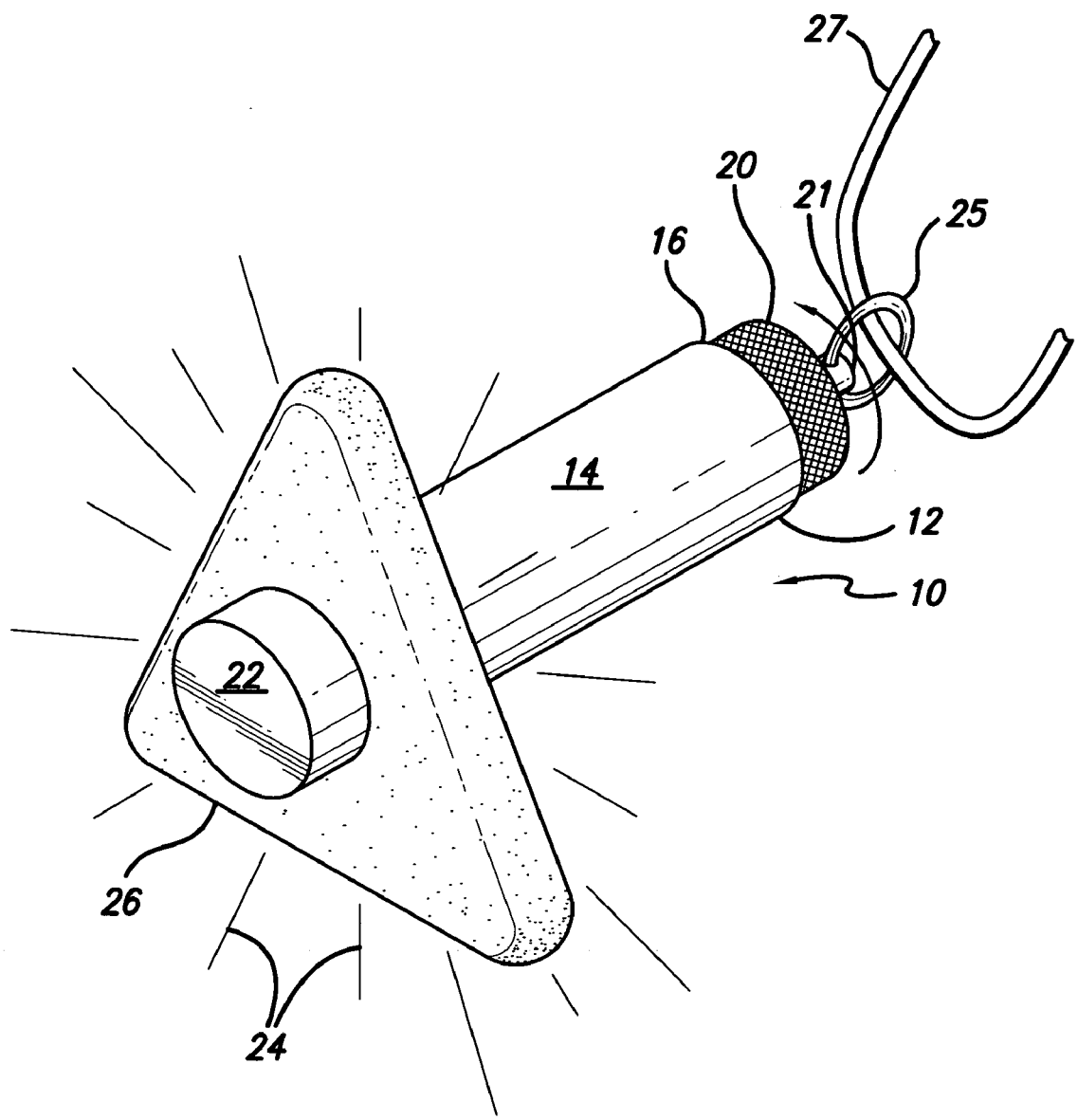
FIG. 1 is a perspective view of the device in accordance with the present invention shown with the power source turned on and the dispersion of the emitted light rays.
Figure 2:
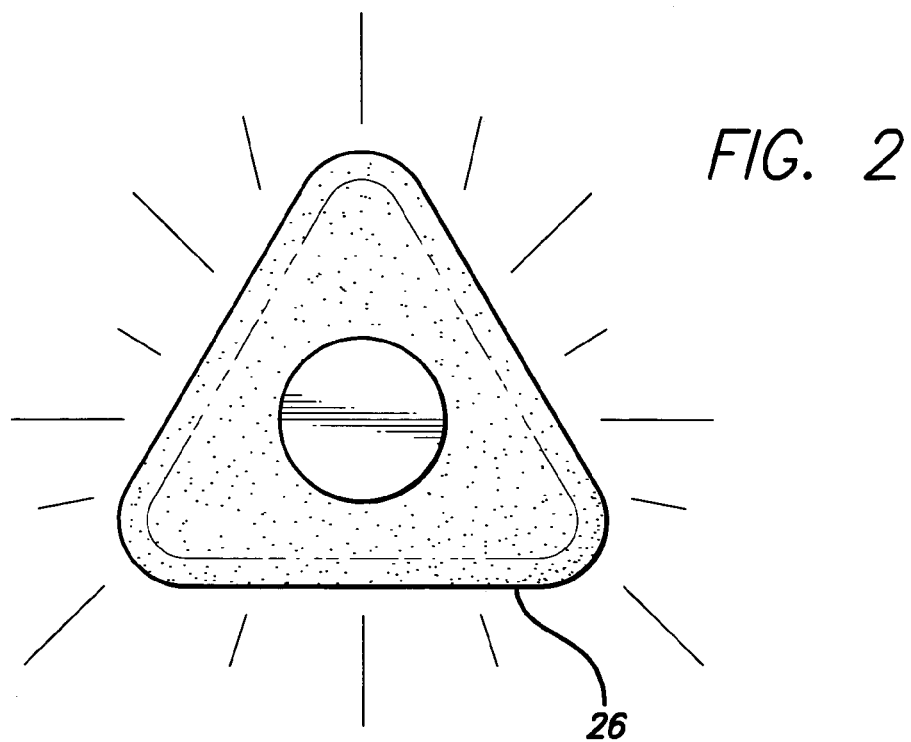
FIG. 2 is a front elevational view of the device in accordance with the present invention shown with the power source on and the dispersion of the emitted light rays.
Figure 3:
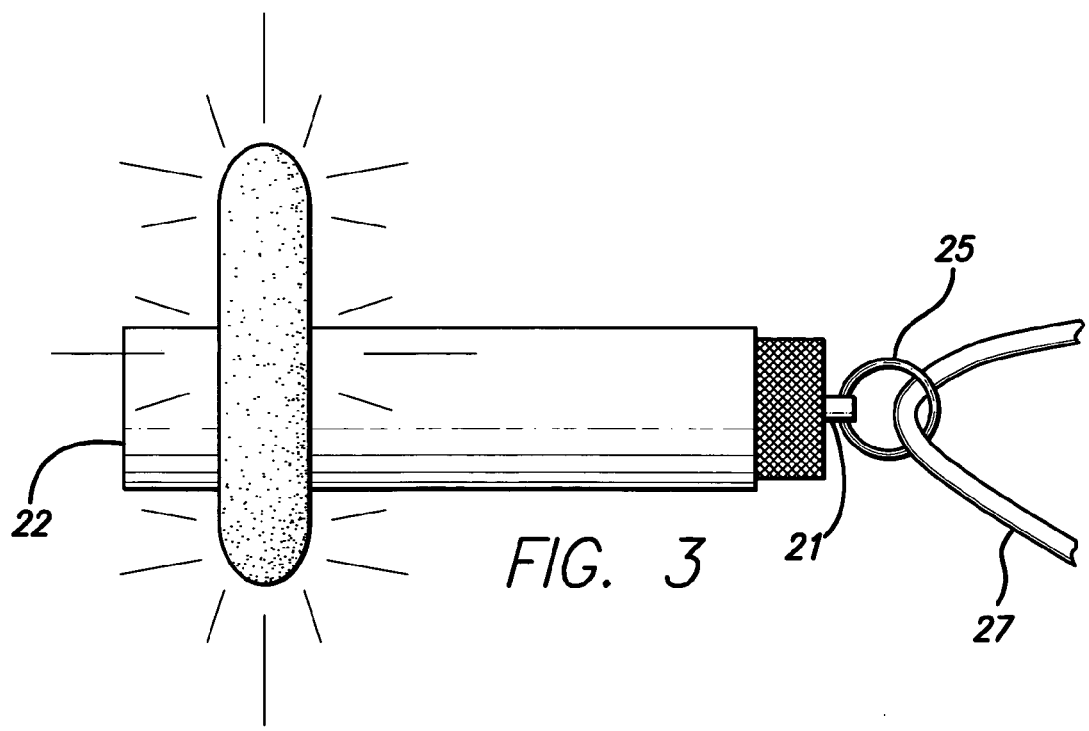
FIG. 3 is a side elevational view of the device illustrated in FIG. 2.

Referring more particularly to the drawings, FIG. 1 is a perspective view of the device 10 for dispersing light rays, which comprises a tubular light source 12 having a housing body 14, a first end 16 containing a power source 18, a cap 20 for sealing first end 16 and enclosing power source 18 and an actuating rod 21 with a ring 25 for use as a rotatable switch for regulating power source 18. Ring 25 is also useful to receive a cord 27, chain or similar means to hang device 10 around the user's neck or as a means to hold the device without interfering with the light emissions. Housing body 14 also includes a second end 22 with an adjacent section 23 through which light rays 24 are projected from inside the housing. A translucent member 26 has an opening 24 therein tailored to enable member 26 to be easily installed and secured firmly over and around section 23 to enhance the scattering and visibility of light rays 24 emitted from inside housing body 14.

Translucent member 26 may also be transparent and is usually comprised of a polyethylene material or some other material equally as suitable. Though preferably triangular in shape, member 26 may also be square, rectangular, round or some other suitable configuration. In addition to its application as a light dispersion medium, member 26 is also employed as a support stand to elevate and stabilize tubular light source 12 and enhance the dispersion of light rays 24 in all directions.

Light rays 24 can be emitted from light source 12 in a variety of modes, including without limitation, equal flash lengths, a beacon strobe, a slow strobe, an SOS signal and full on mode.

Power source 18 typically is an inexpensive alkaline battery (not shown).

In its preferred application, device 10 is used in several ways, including to alert someone to the presence of a nighttime auto or some other kind of accident, a scuba diver, a rock climber or a nighttime bicycle rider. The device can be hung around a person's neck (using cord 27), hung from or attached to an item of clothing or placed on the ground nearby the accident site, etc.

The greatest attribute of the invention is its ability to expand and project at relatively much greater distances light rays emitted from a high intensity light source to ensure their maximum impact and visibility.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

The invention claimed is:

1. In combination with a tubular light source having a housing body and a closed end for containing a power source and a light emitting end, a device for enhancing the dispersion of light rays comprising;

a translucent member having a stand for elevating and stabilizing said tubular light source and (having) an opening therein tailored to receive and grip said tubular) housing body and positioned around said light emitting end to enhance the scattering and visibility of said light rays emitted from inside said housing body.

2. The device of claim 1 wherein the shape of said translucent member is triangular.

* * * * *